No. 844,001. PATENTED FEB. 12, 1907.
H. M. CLEARWATER & J. TEMPLE.
MACHINE FOR FOLDING COLLARS, CUFFS, &c.
APPLICATION FILED JAN. 25, 1906.

6 SHEETS—SHEET 1.

WITNESSES:

INVENTORS
John Temple and
Harley M. Clearwater.
BY
Ward Cameron.
ATTORNEYS

No. 844,001. PATENTED FEB. 12, 1907.
H. M. CLEARWATER & J. TEMPLE.
MACHINE FOR FOLDING COLLARS, CUFFS, &c.
APPLICATION FILED JAN. 25, 1906.

6 SHEETS—SHEET 2.

WITNESSES:

INVENTORS
John Temple and
Harley M. Clearwater
BY
Ward Cameron
ATTORNEYS

No. 844,001. PATENTED FEB. 12, 1907.
H. M. CLEARWATER & J. TEMPLE.
MACHINE FOR FOLDING COLLARS, CUFFS, &c.
APPLICATION FILED JAN. 25, 1906.

6 SHEETS—SHEET 3.

WITNESSES: INVENTORS
John Temple and
Harley M. Clearwater
BY
Ward Cameron
ATTORNEYS No. 844,001. PATENTED FEB. 12, 1907.
H. M. CLEARWATER & J. TEMPLE.
MACHINE FOR FOLDING COLLARS, CUFFS, &c.
APPLICATION FILED JAN. 25, 1906.

6 SHEETS—SHEET 4.

WITNESSES:
INVENTORS
John Temple and
Harley M. Clearwater
BY
Ward Cameron
ATTORNEYS No. 844,001. PATENTED FEB. 12, 1907.
H. M. CLEARWATER & J. TEMPLE.
MACHINE FOR FOLDING COLLARS, CUFFS, &c.
APPLICATION FILED JAN. 25, 1906.

6 SHEETS—SHEET 5.

WITNESSES:

INVENTORS
John Temple and
Harley M. Clearwater
BY
Ward Cameron
ATTORNEYS

No. 844,001. PATENTED FEB. 12, 1907.
H. M. CLEARWATER & J. TEMPLE.
MACHINE FOR FOLDING COLLARS, CUFFS, &c.
APPLICATION FILED JAN. 25, 1906.

6 SHEETS—SHEET 6.

WITNESSES:

INVENTORS
John Temple and
Hailey M. Clearwater
BY
Waid Cameron
ATTORNEYS

UNITED STATES PATENT OFFICE.

HARLEY M. CLEARWATER, OF TROY, AND JOHN TEMPLE, OF WATERVLIET, NEW YORK.

MACHINE FOR FOLDING COLLARS, CUFFS, &c.

No. 844,001.  Specification of Letters Patent.  Patented Feb. 12, 1907.

Application filed January 25, 1906. Serial No. 297,757.

*To all whom it may concern:*

Be it known that HARLEY M. CLEARWATER, a citizen of the United States, residing at the city of Troy, in the county of Rensselaer and State of New York, and JOHN TEMPLE, a subject of the King of Great Britain, residing at the city of Watervliet, in the county of Albany and State of New York, have invented certain new and useful Improvements in Machines for Folding Collars, Cuffs, &c., of which the following is a specification.

Our invention relates to mechanism for folding the edges of fabrics; and the object of our invention is to provide a machine by the operation of which one person is able to fold the edges of a collar, cuff, or other fabric in which the folding is completed and the folding device removed from contact with the folded-over portion before pressure is applied to the overturned edges, together with such elements and combinations as are hereinafter more particularly set forth and described. We attain this object by means of the mechanism illustrated in the accompanying drawings, in which—

Figure 1:
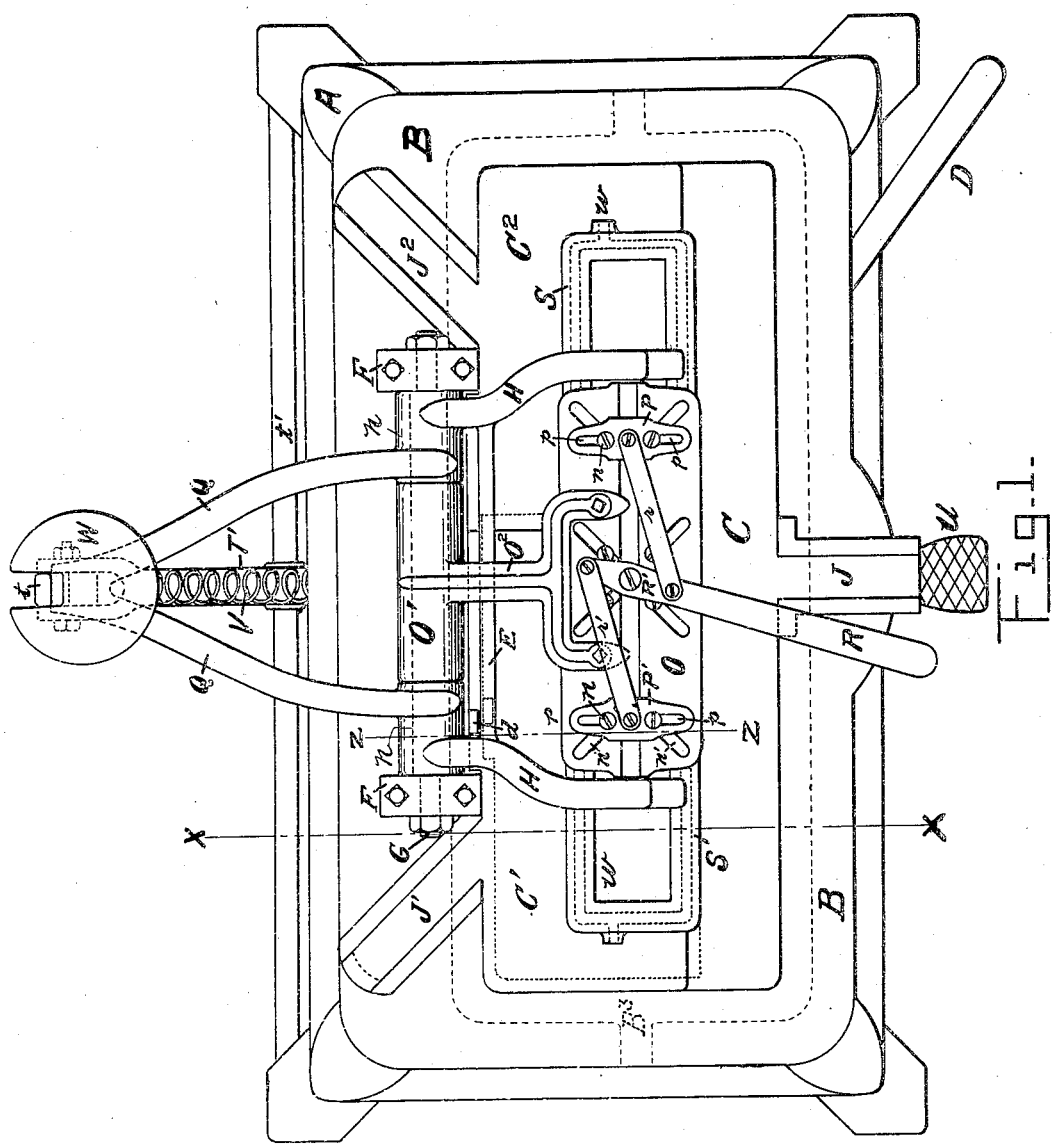
Figure 2:
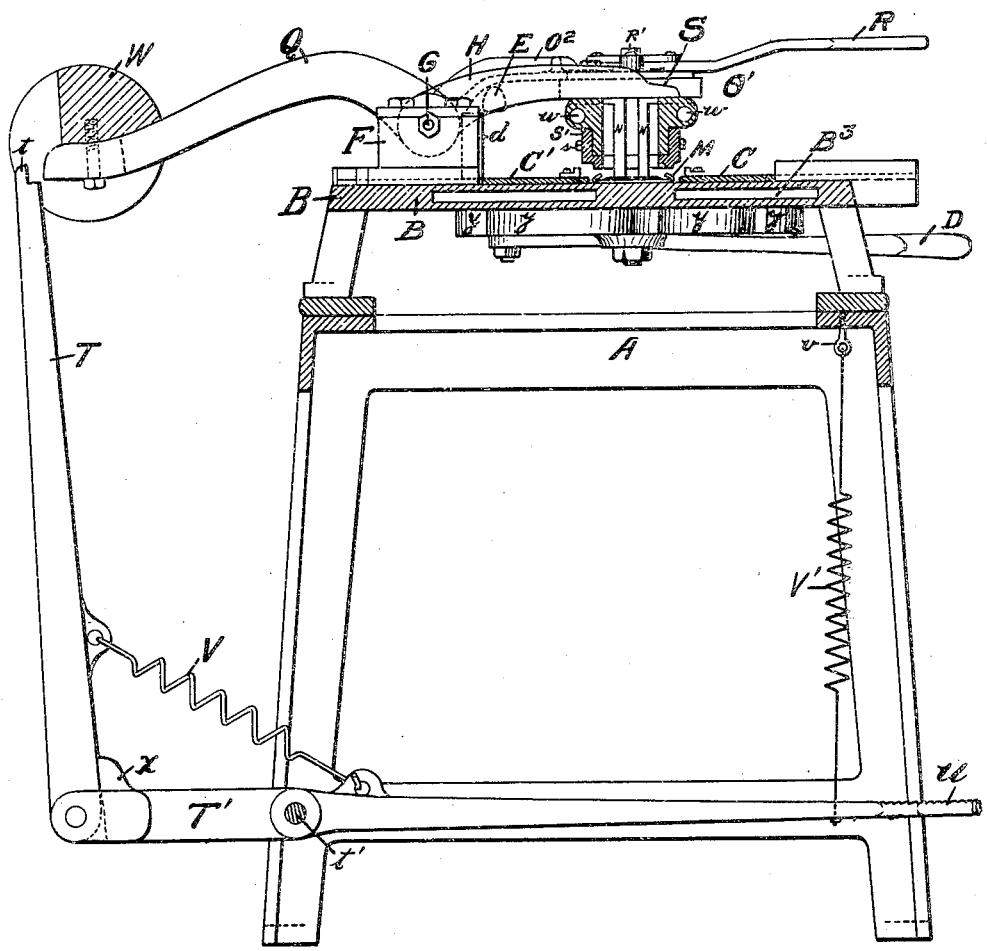
Figure 7:
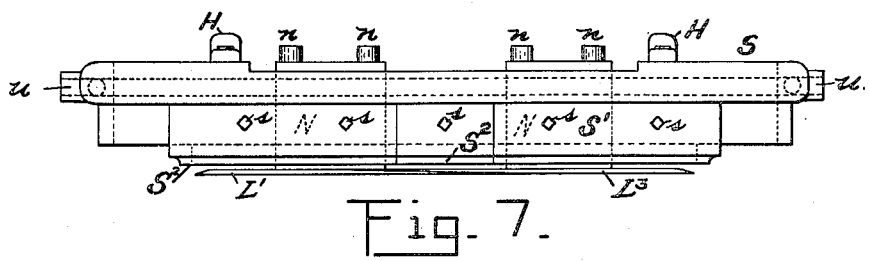
Figure 3:
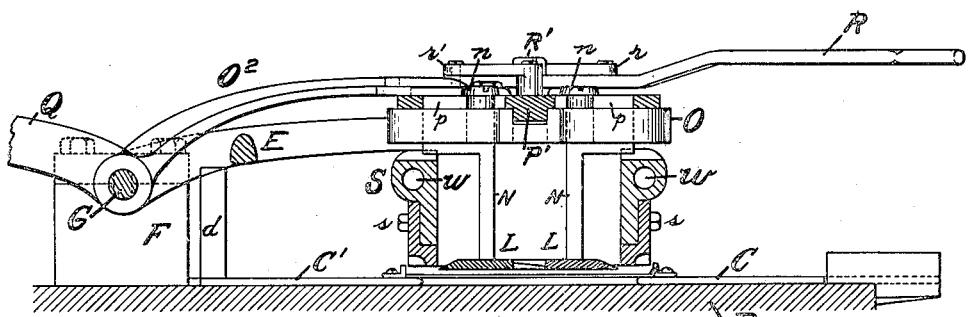
Figures 4, 5:
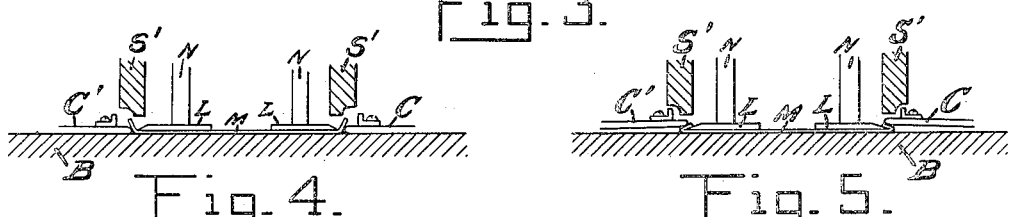
Figure 6:
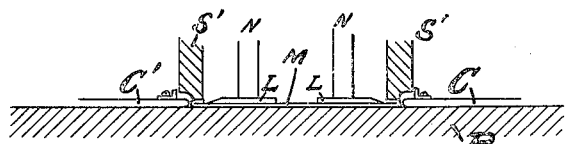
Figure 8:
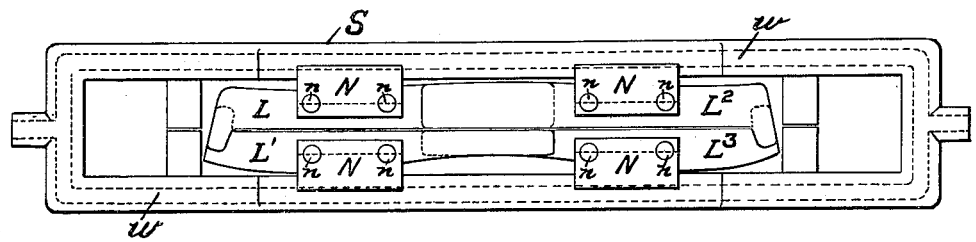
Figure 9:
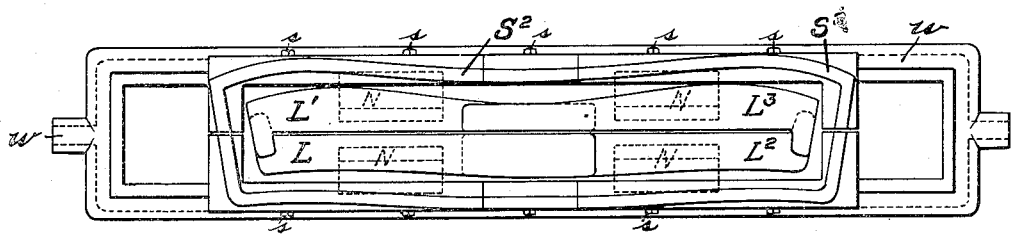
Figure 10:
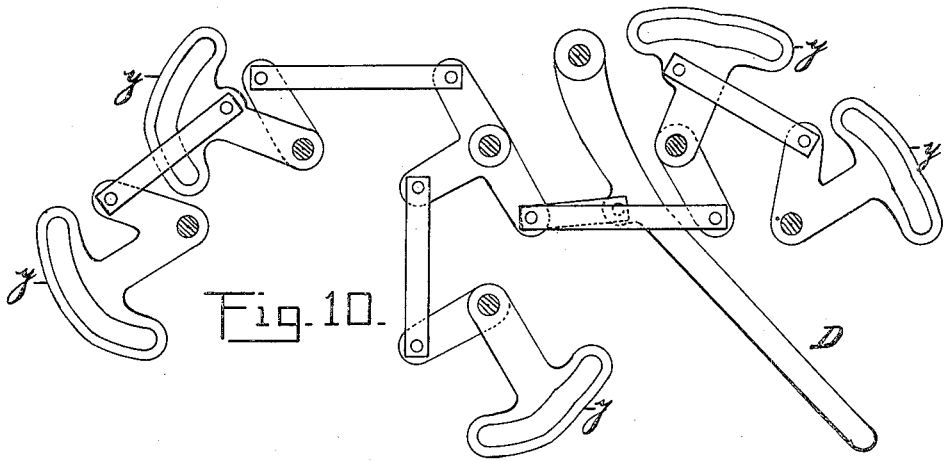
Figure 11:
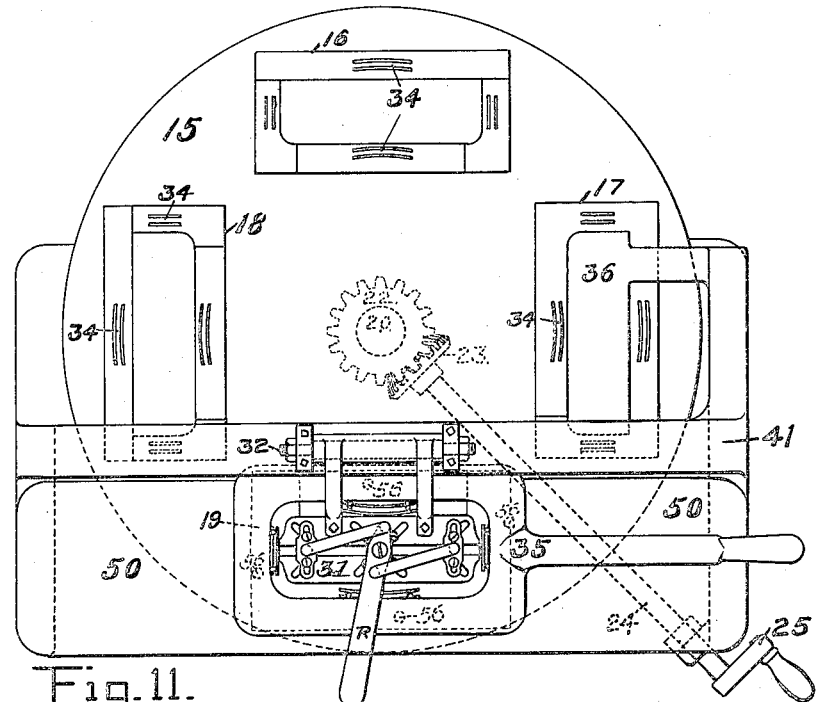
Figure 12:
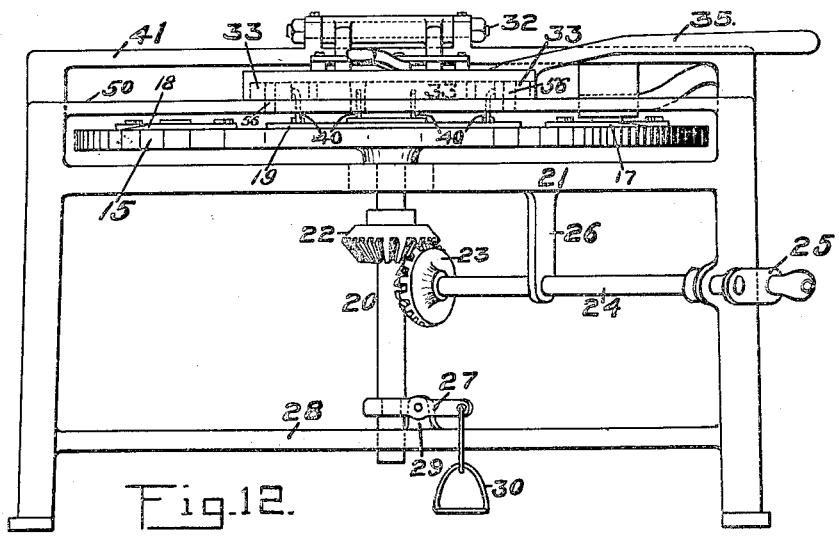
Figure 13:
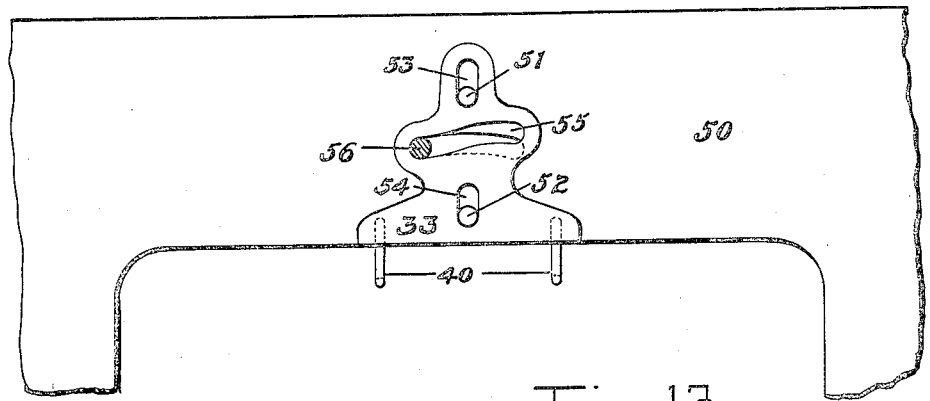
Figure 14:
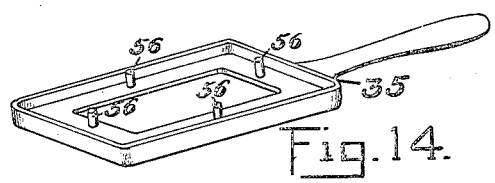
Figure 15:
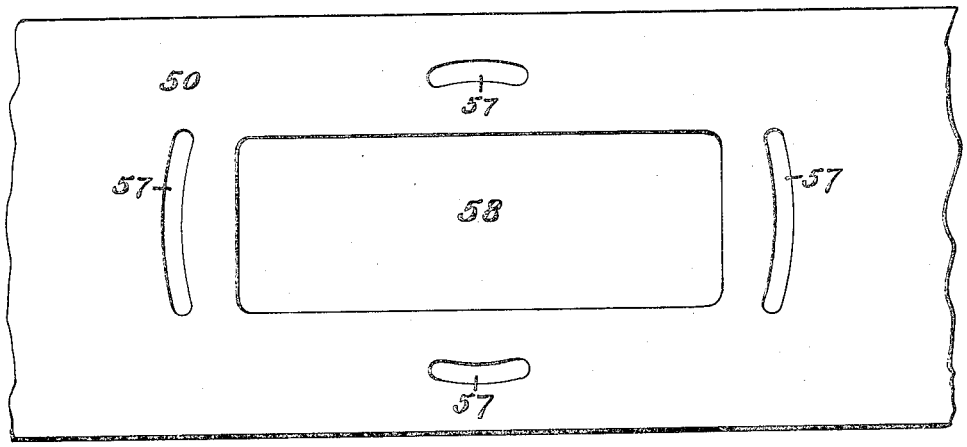

Figure 1 is a plan. Fig. 2 is a transverse section along the line X X on Fig. 1. Fig. 3 is a section of the presser and die-head along the line Z Z on Fig. 1. Fig. 4 is a detail diagrammatic view in section, showing position of the folder and goods on the first movement in the operation of folding. Fig. 5 is a diagrammatic detail view showing the position of the folder and goods after the goods are folded in. Fig. 6 shows the position of the goods and guide when the presser is brought in contact with the goods after the folder and die have both been withdrawn. Fig. 7 is a front elevation of the presser and die-head. Fig. 8 is a plan of presser-head and dies. Fig. 9 is a plan of the under side of presser-head and dies. Fig. 10 is a detail plan view of the cams and links used to operate the folders. Fig. 11 is a plan of a modified form of our invention. Fig. 12 is a front elevation of said modified form shown in Fig. 11. Fig. 13 is a detail view of the cam and cam-support used on said modified form shown in Figs. 11 and 12. Fig. 14 is a perspective view of the under side of the cam-lever used to operate cams such as shown in Fig. 13. Fig. 15 is a detail view of the cam-support 50 used in the modified form shown in Figs. 11 and 12.

Similar letters refer to similar parts throughout the several views.

The machine consists of a bed B, mounted on a frame A, the bed B having mounted upon its surface a series of folders C, C', and $C^2$, said folders being adapted to be moved toward or from the center by means of the cams Y, (see Fig. 10,) attached to the folders C, C', and $C^2$, which cams Y are operated by means of the handle D. Details of the cams Y, their operating-handle D, and their connections are shown in Fig. 10. To the folder C' is secured a detent, which may be in the form of the upright $d$, which when the folder C' is moved toward the center will engage with the cross-bar E, attached to the presser-head, which will prevent the presser-head from being brought down in contact with the work while the folder C' is in engagement therewith. The operative position of the folders and the presser-head is that in which they are in the normal operation of the machine in engagement with the work.

To the bed B, preferably at the rear thereof, we arrange the post F, carrying the stationary shaft G, about which the presser and die heads rotate. On the bed we also arrange the guides J, J', and $J^2$, by means of which the folders C, C', and $C^2$, respectively, are directed in their course toward the center of the machine, each of said folders C, C', and $C^2$ having an extension fitting in said guides J, J', and $J^2$, respectively.

Mounted upon the stationary shaft G by means of the arms H H, rotatably secured thereto, is the presser-head S. A die-head O is provided on its under surface, as shown in Figs. 2, 3, 4, 5, 6, 7, 8, and 9, with collapsible dies L L, the object of the die being to shape the goods to be folded. The dies are constructed of a thin metallic substance, preferably arranged with a feather-edge, as shown in said figures. The dies are made up of four blades L, L', $L^2$, and $L^3$, (see Figs. 8 and 9,) and each of these die-blades is attached to an angle-pin N N; said angle-pin being connected to the die-head O by means of bolts $n$ $n$, which engage with the slots $n'$ in said die-head O. Said die-head O is mounted upon the shaft G by means of a collar O', carrying the arm $O^2$. The lever R is pivoted to the die-head at R' and also attached, by means of the links $r$ and $r'$, to the plate P P', respectively, the plates P and P' being provided with slots $p$ $p$, through which the bolts $n$ $n$ protrude, the links $r$ and $r'$ being preferably secured to the lever R on opposite sides of the pivot R', about which the lever R moves when the dies are either expanded or contracted. It will be noted upon examination of the connections shown in Fig. 1 that when the lever R is moved to the right or left the bolts $n$ $n$ on the angle-pins N, carrying the four blades forming the die, will be moved to and from the center of the machine. In other words, the dies will be opened or closed under the direction of the movement of the lever R.

The die-head is capable of movement up and down or to and from contact with the work placed on the bed, the shaft G being the support about which the die-head is rotated, and the object and function of the die-head is to bring the die in contact with the work placed on the bed B, and when in position thereon, the dies being made of the form which it is desired that the goods should assume when folded, the goods will be forced between the sides of the folders, and the die-blades and the folders will turn the edges of the goods over the dies, as shown in Figs. 4, 5, and 6, causing the proper form to be given the goods. Thus in Fig. 4 the goods are shown with the dies pressing upon them, the edges of the goods resting upon the edges of the folders C and C'. The collar or cuff to be folded is consequently turned between the die-blades and the folders. The part resting on the folders will necessarily be bent over, as shown in Fig. 4. In Fig. 5 the folders have moved toward the center of the machine, and the goods have consequently been turned over upon the feather-edge of the blades. The next movement is shown in Fig. 6, in which the dies have been drawn out of contact with the folded-over portion of the goods, and the folders C C' have returned to position as shown in Fig. 4. It is at this stage in the operation that we desire to exert a pressure upon the folded-over portion in order to cause the goods to be retained in the form which they have been made to assume under the operation illustrated in Figs. 4 and 5. To this end we have a presser-head S, provided with the downwardly-extending portion S'. The contour of the bottom $S^2$ of the downwardly-extending portion S' of the presser-head S is preferably arranged to correspond with the contour of the goods to be pressed, as shown in Fig. 8. We preferably arrange the downwardly-extending portion S' in two or more pieces, securing, by means of bolts $s$ $s$, the same to the presser-head S, this in order that we may take out one portion—say the middle portion, (see Fig. 7)— and substitute another for the purpose of either lengthening or shortening the presser-head proper, which comes in contact with the goods when the dies have been changed, and thus make the presser-head correspond with the work.

The presser-head is mounted, by means of the arms H, on the shaft G. We also secure to the collar $h$, to which the arms H aforesaid are secured, the arms Q Q, carrying the counterbalancing-weight W. Under the arms Q at or near their point of intersection, as shown in Fig. 2, we arrange a lever T, connected with the pedal-lever T', and which has a shoulder $t$, adapted to engage with the arms Q at their intersection, the pedal-lever T' being mounted to the frame, as at $t'$, so arranged that when the foot is on the pedal U on the pedal-lever T' the shoulder $t$ will engage with the ends of the arm Q and raise said arm, which will bring the presser-head downward, causing the under side thereof to engage with the goods on the bed of the machine. We preferably arrange the spring V, as shown in Fig. 2, attached to the lever T and the pedal-lever T', also the spring V', attached to the pedal-lever T' and to the screw $v$, attached to the bed of the frame. The spring V' being to raise the pedal-lever T' when the foot is removed therefrom, the spring V holds the lever T in contact with the stop X. When the foot is pressed on the pedal, the lever T is at once brought forward, and the shoulder $t$ engages the intersection of the arms Q. A further pressure raises the weight W and causes the presser-head to engage the goods, the spring V giving and allowing this operation without straining, as would be the case if the levers T and T' were rigidly connected. The presser-head is raised by the weight W and lowered by the operation of pedal-lever T'.

The bed is heated by pipe carrying steam passing through or connected with a steam-chamber $B^3$ in the bed. The presser-head is provided with heat by conveying steam to chamber W W. The means for thus conveying the steam is not shown. This arrangement of the presser-head, so that it may be heated, is a new feature in folding-machines and is a very important part of the invention, as it greatly increases the output and efficiency of the machine.

In the modified form shown in Figs. 11, 12, 13, 14, and 15 we have arranged a movable bed and a series of folders placed thereon, a means for bringing the collapsible die in contact with the cuff or collar to be folded in one position of the movable bed and apply the pressure through a presser-head at a different position of the said movable bed. Thus in Figs. 11 and 12 the bed 15, which is preferably circular in contour, is provided with a series of folders 16, 17, 18, and 19, located along the edge of the bed, substantially as shown in Fig. 11. The bed 15 is mounted on a shaft 20, which passes through a frame 21 and carries the beveled gear 22, meshing with the gear 23 on shaft 24, which is supported by the side of the frame and carries a crankarm 25. The shaft 24, being preferably supported in the frame and in any suitable bracket 26, may be operated by means of the crank 25, whereby the bed 15 will be rotated about its center. The bed may also be raised by means of the lever 27, fulcrumed on the frame 28 by means of a suitable support 29, and which lever is attached to the shaft 20 on one side of its fulcrum and to the stirrup 30, attached to the other side of the fulcrum, whereby as pressure is placed upon the stirrup the shaft 20 will be moved vertically, causing the bed to be raised. We have arranged a collapsible die 31 mounted upon a shaft 32, secured on a bar 41, forming a part of the frame of the machine above the bed 15, the collapsible die and support being not materially different from that already herein described. It is understood that when a collar or cuff is placed on the bed 15 in proper position in reference to the folders, that the die 31 is brought down upon the goods, forcing them between the sides of the folders and the blades of the die, in the same manner and for the same purpose as heretofore described in reference to the device shown in Fig. 4, and the operation of the die will be the same as that illustrated in Figs. 5 and 6. After the die has been brought in contact with the goods the bed 15 is raised, which will cause the slots 34 of the folders to be entered by the depending fingers 40, which fingers are attached to the cams 33. (See Figs. 12 and 13.) Attached to the cams is the cam-lever 35. Mounted above the bed 15 is a support or shelf 50, which extends across the front of the machine and a portion of the depth thereof. (Shown in Figs. 11, 12, 13, and 15.) Upon the shelf 50 we place a series of cams 33, to which are attached the depending fingers 40. Attached to the shelf 50 are the pins 51 and 52, which engage the cams 33 for the purpose of retaining the cams in proper position. The pin 51 engages the slot 53 in the cam, and the pin 52 engages the slot 54 in the cam. The movement of the cam would then be upon the pins 51 and 52 in a direction indicated by the slots 53 and 54. There is a slot 55 in the cam, with which one of the projections 56 on the cam-actuating lever 35 engages, as shown in Figs. 13 and 15, and by the movement of which said projection will cause the cam to move to and from the center and along the slotted openings upon the pins 51 and 52. It being understood that there is one cam to each folder in the machine illustrated, the cam-lever 35 therefore contains four projections 56, each engaging with a similar slot 55 in a cam corresponding to that shown in Fig. 13, and by the movement of the lever 35 the cams will thus be moved to and from the center. Beneath the cams 33 and in the shelf 50 we arrange concentric slots 57 and an opening 58, through which last-mentioned opening the collapsible die may be brought in contact with the work. Each projection 56 on the cam-lever 35 extends into a slot 57 after passing through a slot 55 in the cam. The movement of the cam-lever 35 when the projections 56 thereon are in engagement with the concentric slots 57 in the stationary shelf 50 will cause each of the cams to move to and from the center, depending upon the direction of the movement of the lever. The opening 58, through which the collapsible die extends, also allows for the projection of the fingers 40 in order that they may engage with the slots 34 in the folders. Thus when the bed has been raised and the cams, supported just above the bed, are brought in contact with the folders an operation of the handle 35 will, because of the formation of the cams, cause the folders beneath the die 31 to move toward the center or from the center, depending upon the direction of the movement of the handle. After the folders and dies have been moved to the position shown in Fig. 6, the collar or cuff being then folded, the bed is lowered, and the crank 25 is operated, moving the bed ninety degrees, to the position shown at 17. Above the movable bed we have arranged at this point the presser-head 36, which is of stationary form, having its under surface arranged to conform with the goods that are pressed, which may be accomplished in the manner already described in reference to the presser-head S. This presser-head, however, is rigidly connected to the frame of the machine, and pressure is exerted by raising the bed in the manner described, bringing the work placed between the folder-blades in contact with the under surface of said presser-head. Thus when the die is brought in contact with the blank cuff or collar for the purpose of folding the same the collar or cuff which has already been folded and moved beneath the presser-head will, by the same movement of the bed which causes the goods to be pressed between the die and folders, press the collar or cuff that was last before folded.

In the modified form aforesaid the presser-head and the bed may be heated in substantially the same manner as hereinbefore set forth or in any suitable manner.

What we claim as our invention, and desire to secure by Letters Patent, is—

1. In a folding-machine, the combination of a bed; a series of folders placed thereon; a means for causing said folders to fold the goods over the edges of the collapsible die and then to withdraw from contact therewith; a collapsible die; a pivotally-supported die-head carrying said collapsible die; a pivotally-supported presser-head; a detent to prevent the presser-head from moving to its operative position while the folders are in operative position and permitting said head to move to operative position when said folders have been moved from their operative position; a means for causing said presser-head to press the folded-over portion of the goods after the folders and collapsible die have been withdrawn from contact with the folded-over portion; a means in said presser-head for admitting the passage of a heating agent, substantially as described.

2. In a folding-machine, a bed; a series of folders placed thereon; a means for causing said folders to fold the goods over the edges of the collapsible die and then to be withdrawn from contact therewith; a collapsible die; a pivotally-supported head carrying said die; a pivotally-supported presser-head provided with an opening through which said die passes; a means for holding said presser-head out of contact with the work on the bed until the folders and collapsible die have been withdrawn from the folded-over portion; with a means for bringing said presser-head in contact with the work after said folders have been removed from contact therewith.

3. In a folding-machine, a bed; a series of folders placed thereon; a means for causing said folders to move toward the center of the bed, whereby the goods are folded over the edges of a collapsible die; a collapsible die; a support for said die; a presser-head; a detent to prevent the presser-head from moving to its operative position while the folders are in operative position and permitting said head to move to operative position when said folders have been moved from their operative position; a means for causing said presser-head to engage the folded-over portion of the goods when said folders and dies have been withdrawn therefrom.

4. A folding-machine consisting of a frame; a bed; a series of folders; a means for causing said folders to fold the goods over the edges of a collapsible die; a collapsible die; a means for supporting same; a presser-head; a detent to prevent the presser-head from moving to its operative position while the folders are in operative position and permitting said head to move to operative position when said folders have been moved from their operative position; a means for causing said presser-head to engage said folded-over portion of the goods after the removal of the folders and collapsible die from the folded-over portion.

5. In a folding-machine the combination of a bed for supporting the goods; a series of folders secured thereto and movable thereon; a means for operating said folders; a collapsible die; a hinged support therefor; a presser-head; the bottom of said presser-head provided with a pattern corresponding to the form that the goods to be operated upon are to be caused to assume; a means for adjusting said pattern on said presser-head; a means for raising and lowering said presser-head, substantially as described.

6. In a folding-machine the combination of a bed; a series of folders secured to and movable upon said bed; a means for operating said folders so as to fold the edges of the goods over the edges of a collapsible die; a collapsible die; a pivotal support for said die; a presser-head; a detent to prevent the presser-head from moving to its operative position while the folders are in operative position and permitting said head to move to operative position when said folders have been moved from their operative position; a means for bringing said presser-head in contact with said turned-over portion of the goods after the removal of the dies and folders from contact with the folded-over portion thereof.

7. In a folding-machine; a bed upon which the goods are placed; a series of folders secured to and movable upon said bed; a means for operating said folders; a collapsible die; a hinged support therefor, a presser-head; a pattern adjustably secured to said presser-head; a means for heating said presser-head and said bed; a means for operating said presser-head, all substantially as described.

8. In a folding-machine; a bed; a series of folders secured to and movable upon said bed; a collapsible die; a support therefor; a presser-head; a shaft upon which said presser-head is mounted; a compensating weight mounted on the shaft supporting said presser-head; a lever provided with a shoulder adapted to engage the support of said compensating weight; a pedal-lever fulcrumed to the machine; a spring connecting said levers; a stop secured to one of said levers and against which the other of said levers may engage; with a spring connecting the pedal-lever to the frame of the machine, substantially as described.

In testimony whereof we have hereunto affixed our signatures in the presence of two witnesses.

HARLEY M. CLEARWATER.
JOHN TEMPLE.

Witnesses:
  FREDERICK W. CAMERON,
  LOTTIE PRIOR.